Patented Feb. 23, 1937

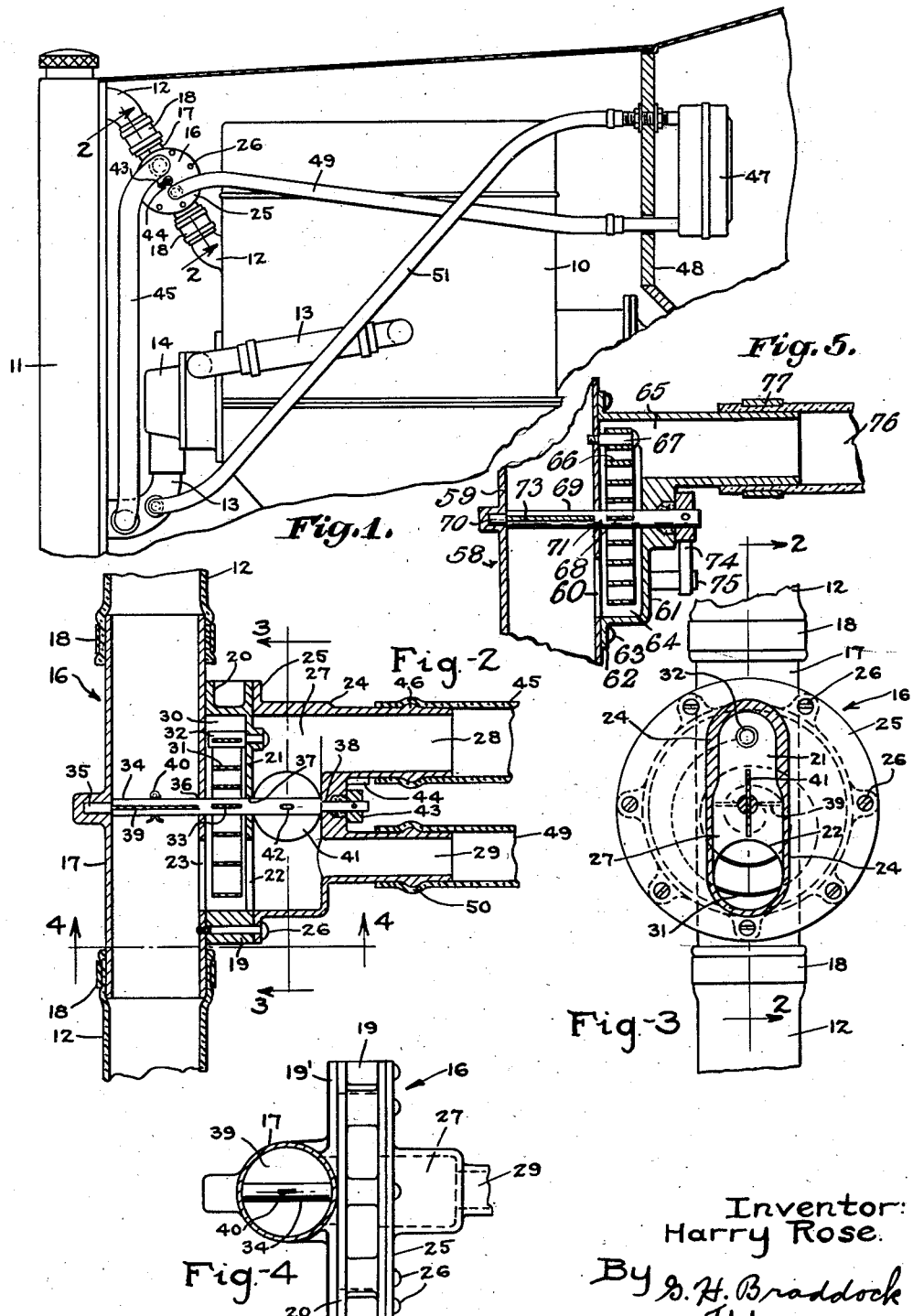

2,071,659

UNITED STATES PATENT OFFICE 2,071,659

ENGINE COOLING AND CAR HEATING SYSTEM AND APPARATUS

Harry Rose, Plymouth, Ind.

Application September 6, 1934, Serial No. 742,904

3 Claims. (Cl. 123—178)

This invention relates to an internal combustion engine cooling and an automative vehicle heating system and apparatus.

More particularly, the invention has relation to a cooling system and apparatus for an internal combustion engine adapted for use with an automotive vehicle and of type employing fluid-cooling or circulating medium, and the invention also has relation to an automotive vehicle heating system and apparatus of type wherein a part of the fluid-cooling or circulating medium of an internal combustion engine as stated is diverted from the fluid-cooling or circulating system and utilized in the heating apparatus as the medium for warming the space to be heated of the automotive vehicle.

An object of the invention is to provide an internal combustion engine cooling system wherein the flow and temperature of fluid-cooling or circulating medium will be more satisfactorily regulated than has heretofore been the case.

A further object is to provide an internal combustion engine cooling system of type employing fluid-cooling or circulating medium and including a novel and improved device for regulating the flow and temperature of the fluid-cooling or circulating medium in the cooling system.

A further object is to provide a combination internal combustion engine cooling and automotive vehicle heating system and apparatus, including controlled passage for flow of fluid-cooling or circulating medium from the engine jacket through the cooling radiator and back to the engine jacket, a by-pass for flow of the fluid-cooling or circulating medium from the engine jacket and back to the engine jacket and clear of said cooling radiator, and passage for flow of fluid-cooling or circulating medium from the engine cooling system through the automotive vehicle heating apparatus, wherein said passage controlling flow through said radiator, said by-pass for flow from and back to the engine jacket, and said passage for flow through the heating apparatus will bear predetermined and suitable relation to each other adapted to at all times and under all conditions insure an approximately fixed and predetermined flow of fluid-cooling or circulating medium from said engine cooling system through said automotive vehicle heating apparatus, to serve as the medium for warming the space to be heated of an automotive vehicle, without appreciably altering satisfactory regulation of flow and temperature of the fluid-cooling or circulating medium in the cooling system itself for the engine.

The invention contemplates the production of a novel and improved internal combustion engine cooling system comprising features for controlling the flow of fluid-cooling or circulating medium in said system to the end that said fluid-cooling or circulating medium can be kept at approximately predetermined and uniform temperature once the engine is heated up, and also contemplates the production of a novel and improved combination of internal combustion engine cooling system with automotive vehicle heating apparatus comprising features for controlling the flow of fluid-cooling or circulating medium from said cooling system to said heating apparatus, to serve therein as the medium for warming the space to be heated of an automotive vehicle, to the end that the pressures of fluid-cooling and fluid-heating medium throughout the whole of the combination internal combustion engine cooling and automotive vehicle heating system will be so regulated as to attain the maximum in heating capacity at said heating apparatus while maintaining the maximum in efficiency in said internal combustion engine cooling system. That is to say, the invention contemplates the production of an automotive vehicle engine cooling system designed to maintain the cooling medium of the system at uniform and desired temperature, and additionally contemplates the production of an automotive vehicle heating apparatus utilizing the cooling medium of said engine cooling system as the heating medium for the space to be heated of the automotive vehicle to the attainment of maximum heating capacity at said heating apparatus while maintaining said uniform and desired temperature condition in said engine cooling system undisturbed.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification:

Fig. 1 is a fragmentary elevational view, partially in section, disclosing an automotive vehicle engine and the body of an automobile, the view also including, in elevation, an engine cooling and vehicle body heating arrangement made according to the invention;

Fig. 2 is a sectional view taken on line 2—2 in Fig. 1, or as on line 2—2 in Fig. 3;

Fig. 3 is a sectional view taken as on line 3—3 in Fig. 2;

Fig. 4 is a sectional view taken as on line 4—4 in Fig. 2; and

Fig. 5 is a detail sectional view, corresponding generally with the disclosure of Fig. 2, but showing a modified form of device for regulating the flow of the fluid-cooling or circulating medium.

With respect to Figs. 1 to 4 of the drawing and the numerals of reference thereon, 10 denotes the engine jacket, 11 the fluid cooling radiator, 12 the fluid connection from the jacket to the radiator, 13 the fluid connection from said radiator to said jacket, and 14 represents, generally, the usual pump for the fluid-cooling medium of an automotive vehicle 15 of any ordinary or preferred character, such as a pleasure vehicle, taxicab, bus or truck. Ordinarily, the fluid-cooling medium is circulated by the pump 14 from the jacket 10 through the connection 12 toward the radiator 11, and back to the jacket through the connection 13.

A novel and improved device 16 is for regulating the flow of the fluid-cooling or circulating medium, usually water, through the automotive vehicle engine cooling system. The device 16 is adapted to be removably assembled in the connection 12, as shown more clearly in Figs. 1, 2 and 3, and includes a tubular element 17 the opposite ends of which are detachably connected in fluid-tight fashion, as at 18, with adjacent portions of said connection 12, so that the fluid passage leading from the engine jacket 10 to the cooling radiator 11 is constituted by the tubular elements 12 and 17, as will be understood.

A casing or housing member 19, desirably of annular conformation, is suitably attached to a flange 19' upon the outer wall of the tubular element 17, said member 19 including a base portion 20 secured to said flange 19' in fluid-tight fashion, and a disc portion 21 in spaced relation to the wall of the tubular element 17 and parallel to the plane of said wall. At one side of the disc portion 21, the lower side as shown, there is an opening 22, and the wall of the tubular element 17 includes an opening 23 desirably in alinement with the opening 22. The base portion 20 of the casing or housing member 19 completely surrounds the opening 23 in fluid-tight fashion, as will be evident from Figs. 2 and 4.

A fitting 24 includes a base portion 25 suitably secured in fluid-tight fashion to the outer surface of the casing or housing member 19 and about the opening 22. As disclosed, screw bolts 26 connect the tubular element 17 with flange 19', the member 19 and the fitting 24 to each other. The base portion 25 merges into an elongated channel or cavity 27 of said fitting 24, which channel or cavity has one of its ends arranged adjacent to the opening 22 in communicating relation to the tubular element 17 and its other end arranged in spaced relation to said opening 22. The end of the channel or cavity which is spaced from the opening 22 leads to an outlet 28 of the fitting 24 of relatively large internal diameter, but smaller than the internal diameter of the passage or connection 12—17, and the passage for fluid-cooling medium from the tubular member 17 through the openings 23 and 22 to said outlet 28 is through the length of said channel or cavity 27. The end of the channel or cavity 27 which is adjacent to the opening 22 leads to an outlet 29 of the fitting 24 of internal diameter relatively smaller than the internal diameter of the outlet 28. The outlets 28 and 29 are for a purpose to be set forth.

The casing or housing member 19 cooperates with the adjacent wall of the tubular element 17 and the flange 19' to provide a chamber 30 for a spiral bimetallic thermostat 31. One end portion of said thermostat is secured, as at 32, to the disc portion 21 at location in spaced relation to the openings 22 and 23. The other end portion of said thermostat is secured, as at 33, to a shaft 34, which shaft is rotatably mounted as at 35 and 36 in opposite walls of the tubular element 17, as at 37 in the disc portion 21, and as at 38 in the fitting 24. The bearing 35 is an internal one, and the bearing 38 includes a packing gland insuring a fluid-tight fit upon the shaft 34. Preferably, the bearings 36 and 37 engage said shaft 34 snugly so that no appreciable amount of fluid can pass the corresponding wall of the tubular element 17 and the disc portion 21, respectively, between the shaft and these mentioned bearings, for a purpose which will appear. As will be more clear from Fig. 2, a portion of the thermostat 31 is located in the chamber 30 at position between the openings 22 and 23.

The shaft 34 extends transversely through the tubular element 17 at location between the opening 23 and the inlet to the radiator, and also through the channel or cavity 27 at location between the outlets 28 and 29, and is arranged axially of the thermostat 31, as will be more clear from Figs. 2 and 3. A throttle valve 39 for controlling the passage or connection 12—17 is fixed, as at 40, to the portion of said shaft 34 which is situated in the tubular element 17, and a throttle valve 41 for controlling the travel of fluid-cooling medium through the channel or cavity 27 is fixed, as at 42, to the portion of said shaft which is situated in said channel or cavity 27. The throttle valves 39 and 41 are set on the shaft 34 so as to be ninety degrees apart, or, in other words, in planes which are perpendicular to each other, and the arrangement is such that at lower temperatures the thermostat 31 maintains the valve 39 in the closed position of the tubular element 17 and the valve 41 in the open position of the channel or cavity 27, as shown in Fig. 2. When fluid-cooling medium which engages the thermostat 31 heats this to a predetermined temperature, said thermostat acts upon the shaft 34 to cause the valve 39 to move toward open position and the valve 41 to move toward closed position, each in equal degree and in direct response and proportion to the extent of thermostatic action. In order that the throttle valves 39 and 41 may now swing in opposite and unintended directions past wide open and completely closed positions, the shaft 34 is desirably equipped with a stop arm 43 adapted to engage spaced apart stops 44 upon the fitting 24, as will be understood.

It is to be observed that the device 16, consisting of the parts described, including the tubular element 17, the casing or housing member 19, the fitting 24, and their appurtenances, constitutes a single unit which is as such associatable with and removable from the connection 12.

A by-pass connection 45 is removably attached, as at 46, to the outlet 28 and to the connection 13 at location between the cooling radiator 11 and the engine pump 14.

It will be assumed for the present that the outlet 29 is shut off, and description will be made of the mode of operation of the engine cooling system as such. As before stated, when the fluid-cooling medium is below a predetermined temperature, the thermostat 31 maintains the throttle valve 39 in position to completely close the passage or connection 12—17 between the engine jacket 10 and the radiator 11, and maintains the throttle valve 41 in the wide open position of the channel or cavity 27, so that all of the flow of fluid-cooling medium moving under the influence of the pump 14 is from the engine jacket 10 to the passage or connection 12—17, through the opening 23 past and in contact with the thermostat 31, through the opening 22 and the channel or cavity 27 past the throttle valve 41 to the outlet 28, and through the by-pass connection 28—45 and the connection 13 back to the engine jacket. When the fluid-cooling medium is heated to reach said predetermined temperature, the thermostat 31 operates to actuate the throttle valve 39 toward open position and the throttle valve 41 toward closed position, each to an extent proportional to the extent the shaft 34 is rotated by said thermostat. Correspondingly, some fluid-cooling medium flows from the engine jacket through the passage or connection 12—17 past the throttle valve 39 to the radiator, and from the radiator through the connection 13 back to the engine jacket, while the flow of fluid-cooling medium through the channel or cavity 27 and the by-pass 28—45 is somewhat reduced. The fluid-cooling medium upon passing through the cooling radiator gives up heat, and in short order the temperature of fluid-cooling medium at the thermostat 31 is reduced below the predetermined temperature which caused the throttle valve 39 to open. Said valve 39 as a consequence again becomes closed. Attention is called to the fact that except at intervals when a high predetermined temperature is reached, none of the flow of fluid-cooling medium is through the cooling radiator, and when there is flow through the cooling radiator at intervals when said high predetermined temperature is reached, there is a relatively quick reduction of the temperature of the fluid-cooling medium causing the valve 39 to close and the valve 41 to be wide open. Attention is also called to the fact that by employment of the valve arrangement as illustrated and described, there is tendency for the throttle valve 39 to gradually open, and the throttle valve 41 to gradually close, so that an excess of fluid-cooling medium is not liable to be forced through the cooling radiator when the valve 39 is opened due to rise of temperature of the fluid-cooling medium. Also, in the present arrangement, there is tendency for said valve 39 to commence to open and to close directly with temperature changes at the thermostat, so that the action of the valve is concurrent with the action of the thermostat and there is no likelihood that the valve 39 will remain open unduly. It will be seen that inasmuch as no fluid-cooling medium is regularly flowing through the cooling radiator, the temperature of said fluid-cooling medium can be regulated much more satisfactorily than in cases where the opposite is the case. The arrangement of the invention minimizes the liability of any appreciable amount of temperature variation of the fluid-cooling medium, especially the portion of the flow of cooling medium past the thermostat, due to the fact that the flow of fluid-cooling medium past the valve 39, through the cooling radiator 11 and back to the engine jacket is gradual, so that no substantial part of the cooling medium is subjected to conditions pointing toward excessive temperature variation.

A heating apparatus 47 is mounted within the interior of the automotive vehicle 15, numeral 48 indicating the dash of said vehicle upon which said heating apparatus is supported in a manner forming no part of the invention. A connection 49 for conveying fluid-cooling medium from the engine cooling system to the heating apparatus, to serve as the medium for warming said apparatus, is detachably connected, as at 50, to the outlet 29, and is also detachably connected to the heating apparatus. A connection 51 leads from said heating apparatus to a portion of the pipe 13 which is between the cooling radiator 11 and the pump 14, as disclosed very clearly in Fig. 1. The heating apparatus 47 is, as shown, of type wherein the fluid-cooling medium of the engine cooling system is circulated from said cooling system through the connection 49 to the heating apparatus, through fluid passageways (not shown) of said heating apparatus, and back to the connection 13 through the connection 51. Ordinarily, means is provided for circulating air through the heating apparatus 47 to absorb heat therefrom for warming the automotive vehicle body.

In addition to providing an internal combustion engine cooling system comprising features for controlling the flow and temperature of fluid-cooling or circulating medium in said cooling system, to keep the fluid-cooling or circulating medium at uniform temperature once the engine is heated up, as already has been described, the invention also provides a combination of internal combustion engine cooling system with automotive vehicle heating apparatus comprising features for controlling the flow of fluid-cooling or circulating medium from said cooling system to said heating apparatus, to serve therein as the medium for warming the space to be heated of an automotive vehicle, in order to regulate the pressures of fluid-cooling and fluid-heating medium throughout the whole of the engine cooling and vehicle heating system in such manner as to attain maximum in heating capacity at the heating apparatus while sacrificing in no degree the efficiency of the internal combustion engine cooling system. To the accomplishment of this result, the internal diameters of the connections 12—17—13, the connection or by-pass 28—45, and the connections 29—49—51, respectively, bear predetermined and suitable relation to each other to at all times and under all conditions insure an approximately fixed and predetermined flow of fluid-cooling or circulating medium from the engine cooling system through the automotive vehicle heating apparatus 47, to serve as the warming medium thereof, without appreciably altering efficient and satisfactory regulation of flow of the fluid-cooling or circulating medium in the cooling system for the internal combustion engine. As illustrated in Figs. 1 to 4 of the drawings, the proportion of the internal cross-sectional area of the by-pass connection 28—45, etc., to the cross-sectional area of the main pipe connections 12—17—13, etc., may be, roughly, as 43 to 100, and the proportion of the internal cross-sectional area of the heating apparatus connections 29—49—51, etc., to the cross-sectional area of said by-pass connection 28—45, etc., may be, roughly, as 40 to 100. The relative sizes of the connections can of course be altered within limits. A satisfactory arrangement would be to utilize connections 12—17—13, etc., of internal diameter one and three-quarters to one and one-quarter inches, with by-pass connection 28—45, etc., of internal diameter approximately one inch, more or less, but smaller than connections 12—17—13, etc., and heating apparatus connections 29—49—51, etc., of internal diameter approximately five-eighths inch, more or less, but smaller than connections 28—45, etc. Thus, the engine cooling system and the apparatus heating system will be nicely balanced, so that a maximum will be attainable both in engine cooling efficiency and automotive vehicle body heating capacity.

It will be evident that maximum in heat at the apparatus 47 will result from the constant passage of maximum of fluid medium through said apparatus, provided said fluid medium is kept at maximum temperature. It will also be evident that in an instance where the amount of fluid medium circulating through the heating apparatus 47, and there cooled, is relatively great compared to the amount of fluid-cooling medium circulating in the engine cooling system, the temperature of said fluid-cooling medium in the cooling system is proportionately affected and altered. That is to say, when the amount of fluid medium passing through the heater is greater than a certain amount, compared to the total amount of fluid-cooling medium in the engine cooling system, the temperature of fluid-cooling medium in the cooling system has considerable tendency toward becoming lowered. Thus it follows that amount of flow of fluid medium through the heating apparatus, to the attainment of maximum heating results, should be the maximum constant flow which will not upset or unbalance a uniform temperature condition in the engine cooling system. In this manner, obviously, the fluid medium made to circulate through the heating apparatus will be maintained at constant temperature, which can be the maximum temperature conformable with proper and desired functioning of the engine cooling system.

In the arrangement as illustrated and described, the passage controlling flow through the cooling radiator, the by-pass for flow from the engine jacket and back to the engine jacket, and the passage for flow through the heating apparatus, all bear predetermined and suitable relation to each other insuring fixed and predetermined flow through the heating apparatus without appreciably altering the regulation of flow and temperature in the cooling system itself, as such, for the engine. As a matter of fact, the engine cooling system will maintain approximately the same operating temperature both when there is circulation of fluid medium through the connections 29—49—51, etc., and when there is no circulation of fluid medium through these connections. On the other hand, there is always sufficient fluid medium present under the pump pressure in the channel or cavity 27 and at the location of entrance to the connection 49 to insure constant and maximum flow of fluid medium through the heater 47, as will be understood.

A novel and improved device 58 is for the same general purpose as is the device 16. Said device 58 is adapted to be removably assembled in a connection such as 12, from the jacket to the radiator, and includes a tubular element 59 the opposite ends of which are detachably connected in fluid-tight fashion with adjacent portions of said connection such as 12, as described in connection with the device 16.

Numeral 60 denotes an opening in the wall of the tubular element 59. A fitting 61 includes a base portion 62 secured in fluid-tight manner, as by screw bolts 63, to the outer surface of the tubular element 59 and about the opening 60. The base portion 62 merges into an annular chamber 64 of said fitting 61, which chamber 64 has one of its sides arranged adjacent to the opening 60 in communicating relation to the tubular element 59 and its opposite side arranged to communicate with an outlet 65 of the fitting 61 of relatively large internal diameter, but smaller than the internal diameter of the tubular element 59.

The chamber 64 houses a spiral bimetallic thermostat 66, one end portion of said thermostat being secured, as at 67, to the wall of the tubular element 59, and the other end portion of said thermostat being secured, as at 68, to a shaft 69. Said shaft 69 is rotatably mounted as at 70 and 71 in opposite walls of the tubular element 59, and as at 72 in the fitting 61. The bearing 70 is an internal one, and the bearing 72 includes a packing gland insuring a fluid-tight fit upon the shaft 69. Desirably, the bearing 71 engages said shaft 69 snugly to prevent the passage of any appreciable amount of water between the shaft and this bearing. The fluid-cooling medium which passes through the chamber 64 contacts with the thermostat 66.

The shaft 69 extends transversely through the tubular element 59 at location between the opening 60 and the inlet to the radiator, as is very clearly shown in Fig. 5. A throttle valve 73 for controlling the tubular element 59 is fixed to the portion of said shaft 69 which is situated in the tubular element 59. The arrangement is such that at lower temperatures the thermostat 66 maintains the throttle valve 73 in the closed condition of the tubular element 59, as shown in Fig. 5. When fluid-cooling medium heats the thermostat 66 to a predetermined temperature, said thermostat acts upon the shaft 69 to cause the throttle valve 73 to move toward open position in direct response and proportion to the extent of thermostatic action. So that said throttle valve 73 may not swing in opposite and unintended direction past completely closed position, the shaft 69 may be equipped with a stop arm 74 adapted to engage spaced apart stops 75 upon the fitting 61.

The device 58, of the same general character as the device 16, consisting of the parts described, including the tubular element 59, the fitting 61, and their appurtenances, likewise constitutes a single unit associatable with and removable from a connection such as 12.

A by-pass connection 76 is removably attached, as at 77, to the outlet 65 and to a connection such as 13 at location between the cooling radiator and the engine pump.

When the fluid-cooling medium is below a predetermined temperature, the thermostat 66 maintains the throttle valve 73 in the closed condition of the tubular element 59 between the engine jacket and the cooling radiator, so that all of the flow of fluid-cooling medium forced by the pump is from the engine jacket to the tubular element 59, through the opening 60 past and in contact with the thermostat 66, and through the by-pass connection 65—76 and the connection such as 13 back to the engine jacket. When the fluid-cooling medium is heated to said predetermined temperature, the thermostat 66 operates to actuate the throttle valve 73 toward open position to an extent proportional to the rotation of the shaft 69 by said thermostat. Correspondingly, some fluid-cooling medium flows from the engine jacket through the tubular element 59 past the throttle valve 73 to the cooling radiator, and from said radiator through the connection such as 13 back to the engine jacket, while fluid-cooling medium in lessened amount flows through the chamber 64 and the by-pass 65—76. The fluid-cooling medium upon passing through the cooling radiator gives up heat, and a short while later the temperature of fluid-cooling medium at the thermostat 66 is reduced below the high predetermined temperature which caused the throttle valve 73 to open. Said valve as a consequence again becomes closed. As set forth in connection with the disclosure of Figs. 1 to 4, there is no flow of fluid-cooling medium through the cooling radiator, except at intervals when a predetermined high temperature is reached, and when there is flow through said cooling radiator, there is a relatively quick reduction of the temperature of the fluid-cooling medium causing the throttle valve 73 to close. In the arrangement of Fig. 5, as well as in the arrangement of Figs. 1 to 4, there is tendency for the throttle valve 73 to gradually open, so that an excess of fluid-cooling medium is not liable to be forced through the cooling radiator when the throttle valve 73 is opened because of rise of temperature of the fluid-cooling medium at the thermostat. As was stated in connection with the throttle valve 39, there is tendency for the valve 73 to commence to open and to close directly with temperature changes at the thermostat, making the action of said valve 73 concurrent with the action of the thermostat and presenting no liability that the valve will remain open unduly. As no fluid-cooling medium is regularly flowing through the cooling radiator, the temperature of the fluid-cooling medium can be regulated as nicely and as satisfactorily with the arrangement of Fig. 5 as in the cooling system of Figs. 1 to 4, as will be apparent. When employing the present construction, the liability of appreciable temperature variation of the fluid-cooling medium is minimized, because of the gradual flow of fluid-cooling medium past the valve 73, through the cooling radiator and back to the engine jacket. At no time or place in the cooling system is any substantial part of the fluid-cooling medium subjected to conditions pointing toward excessive temperature variation.

What is claimed is:

1. In an internal combustion engine cooling system comprising an engine jacket, a cooling radiator, a fluid connection from said jacket to said radiator, a fluid connection from said radiator to said jacket, and a pump for circulating fluid-cooling medium in said cooling system, a by-pass connection between said fluid connections, a throttle valve for controlling passage of fluid-cooling medium through said fluid connection from said jacket to said radiator, a throttle valve for controlling passage of fluid-cooling medium through said by-pass connection, a shaft supporting said throttle valves, and a thermostat for rotating said shaft to regulate said throttle valves, said thermostat being subjected to fluid-cooling medium which travels through said by-pass connection.

2. In an engine cooling system comprising an engine jacket, a cooling radiator, a fluid connection from said jacket to said radiator, a fluid connection from said radiator to said jacket, and a pump for circulating fluid-cooling medium in said cooling system, a by-pass connection between said fluid connections, a throttle valve for controlling passage of fluid-cooling medium through said fluid connection from said jacket to said radiator, a throttle valve for controlling passage of fluid-cooling medium through said by-pass connection, a single shaft rotatably supporting both of said throttle valves, and a thermostat for rotating said shaft to regulate said throttle valves, said thermostat being connected to said shaft and situated in said by-pass connection.

3. In an engine cooling system comprising an engine jacket, a cooling radiator, a fluid connection from said jacket to said radiator, a fluid connection from said radiator to said jacket, and a pump for circulating fluid-cooling medium in said cooling system, a by-pass connection between said fluid connections, a throttle valve for controlling passage of fluid-cooling medium through said fluid connection from said jacket to said radiator, a shaft rotatably supporting said throttle valve, and a thermostat for rotating said shaft to regulate said throttle valve, said thermostat being situated in said by-pass connection.

HARRY ROSE.